US009487691B2

(12) United States Patent
Ravi et al.

(10) Patent No.: US 9,487,691 B2
(45) Date of Patent: Nov. 8, 2016

(54) POZZOLAN FOR USE IN A CEMENT COMPOSITION HAVING A LOW HEAT OF HYDRATION

(71) Applicant: HALLIBURTON ENERGY SERVICES, INC., Houston, TX (US)

(72) Inventors: Krishna M. Ravi, Houston, TX (US); Rahul C. Patil, Pune (IN); Sandip P. Patil, Pune (IN); Trissa Joseph, Houston, TX (US); Marcus Duffy, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 400 days.

(21) Appl. No.: 13/889,213

(22) Filed: May 7, 2013

(65) Prior Publication Data
US 2014/0332216 A1 Nov. 13, 2014

(51) Int. Cl.
| C09K 8/46 | (2006.01) |
| C04B 28/04 | (2006.01) |
| E21B 33/13 | (2006.01) |
| C09K 8/467 | (2006.01) |
| C04B 28/06 | (2006.01) |
| C04B 28/08 | (2006.01) |
| C04B 28/14 | (2006.01) |
| C04B 28/32 | (2006.01) |
| C04B 103/00 | (2006.01) |
| C04B 111/00 | (2006.01) |
| C04B 111/76 | (2006.01) |

(52) U.S. Cl.
CPC ............. *C09K 8/467* (2013.01); *C04B 28/04* (2013.01); *C04B 28/06* (2013.01); *C04B 28/08* (2013.01); *C04B 28/14* (2013.01); *C04B 28/32* (2013.01); *C04B 2103/0088* (2013.01); *C04B 2103/0089* (2013.01); *C04B 2111/00215* (2013.01); *C04B 2111/76* (2013.01)

(58) Field of Classification Search
CPC .............................. C09K 8/467; C04B 28/14
See application file for complete search history.

(56) References Cited

U.S. PATENT DOCUMENTS

| 3,832,196 | A | * | 8/1974 | Broussard et al. ........... 106/706 |
| 3,876,005 | A | * | 4/1975 | Fincher et al. ............... 166/292 |
| 4,181,533 | A | * | 1/1980 | Wilson .......................... 106/694 |
| 5,121,795 | A | * | 6/1992 | Ewert et al. .................. 166/292 |
| 5,263,542 | A | * | 11/1993 | Brothers ....................... 166/293 |
| 5,301,754 | A | * | 4/1994 | Cowan et al. ................ 166/295 |
| 5,340,397 | A | * | 8/1994 | Brothers ....................... 106/727 |
| 5,346,012 | A | * | 9/1994 | Heathman ............... C04B 7/527 106/727 |
| 5,346,550 | A | | 9/1994 | Kunzi et al. |
| 5,370,181 | A | * | 12/1994 | Nahm et al. ............. 166/250.14 |
| 5,383,521 | A | * | 1/1995 | Onan et al. ................... 166/293 |
| 5,479,987 | A | * | 1/1996 | Hale ....................... C04B 18/049 106/730 |
| 5,515,921 | A | * | 5/1996 | Cowan et al. ................ 166/293 |
| 5,547,505 | A | * | 8/1996 | Nakatsu ................... C04B 7/345 106/713 |
| 5,565,026 | A | * | 10/1996 | Hense et al. .................. 106/600 |
| 6,251,179 | B1 | * | 6/2001 | Allan ............................ 106/719 |
| 6,626,243 | B1 | * | 9/2003 | Go Boncan ............. C04B 28/04 166/285 |
| 7,219,733 | B2 | | 5/2007 | Luke et al. |
| 7,373,982 | B2 | * | 5/2008 | Brothers ................. C04B 28/02 166/293 |
| 7,413,014 | B2 | * | 8/2008 | Chatterji et al. .............. 166/292 |
| 7,673,687 | B2 | | 3/2010 | Reddy et al. |
| 8,240,385 | B2 | | 8/2012 | Brothers et al. |
| 8,297,357 | B2 | * | 10/2012 | Brenneis et al. ............. 166/293 |
| 8,347,961 | B2 | | 1/2013 | Brothers et al. |
| 8,551,242 | B2 | * | 10/2013 | Brothers et al. ............. 106/716 |
| 8,808,450 | B2 | * | 8/2014 | Reddy et al. ................. 106/724 |
| 8,895,487 | B2 | * | 11/2014 | Patil et al. .................... 507/269 |
| 8,944,165 | B2 | * | 2/2015 | Patil et al. .................... 166/292 |
| 9,023,150 | B2 | * | 5/2015 | Brenneis et al. ............. 106/713 |
| 2002/0017224 | A1 | * | 2/2002 | Horton ...................... B03B 9/04 106/705 |
| 2002/0038617 | A1 | * | 4/2002 | Stroup ...................... C04B 7/19 106/714 |
| 2003/0233962 | A1 | * | 12/2003 | Dongell ................. C04B 28/02 106/709 |
| 2005/0133221 | A1 | * | 6/2005 | Chatterji et al. ............. 166/292 |
| 2007/0095255 | A1 | * | 5/2007 | Abbate ................... C04B 28/04 106/713 |
| 2007/0221378 | A1 | * | 9/2007 | Brothers et al. ............. 166/293 |
| 2007/0221379 | A1 | * | 9/2007 | Brothers et al. ............. 166/293 |
| 2009/0145602 | A1 | * | 6/2009 | Reddy et al. ............ 166/250.14 |
| 2010/0116170 | A1 | * | 5/2010 | Reddy et al. ................... 106/33 |

(Continued)

OTHER PUBLICATIONS

Kartini, K. "Rice Husk Ash—Pozzolanic Material for Sustainability." International Journal of Applied Science and Technology 1.6. (2011): 169-76. Print.*

(Continued)

Primary Examiner — Zakiya W Bates
Assistant Examiner — Crystal J Miller
(74) Attorney, Agent, or Firm — McGuireWoods LLP

(57) ABSTRACT

A method of cementing in a subterranean formation comprises: introducing a cement composition into a wellbore penetrating the subterranean formation, wherein at least a portion of the subterranean formation has a temperature less than or equal to the freezing point of an aqueous liquid, and wherein the cement composition comprises: (A) cement; (B) water; and (C) a pozzolan, wherein the cement composition has a heat of hydration of less than 50 BTU per pound; and causing or allowing the cement composition to set in the wellbore after the step of introducing. The pozzolan can have a calcium oxide concentration of less than 15% by weight of the pozzolan, and the pozzolan can have a concentration of at least 15% by weight of the cement. Gas hydrates can be present in or adjacent to a portion of the well.

18 Claims, No Drawings

(56) References Cited

U.S. PATENT DOCUMENTS

| | | | | |
|---|---|---|---|---|
| 2010/0240556 A1* | 9/2010 | Keys | ................ | C04B 28/34 507/260 |
| 2010/0282466 A1* | 11/2010 | Brenneis | ............... | C04B 28/021 166/293 |
| 2012/0199350 A1* | 8/2012 | Brothers et al. | .............. | 166/293 |
| 2013/0008353 A1* | 1/2013 | Brothers et al. | .............. | 106/776 |
| 2014/0076204 A1* | 3/2014 | Brenneis et al. | ............. | 106/716 |
| 2014/0196901 A1* | 7/2014 | Patil et al. | .................... | 166/292 |
| 2014/0238275 A1* | 8/2014 | Patil et al. | .................... | 106/733 |
| 2015/0107491 A1* | 4/2015 | Ball | ........................ | C04B 28/08 106/707 |

OTHER PUBLICATIONS

Kris Ravi et al., Cement Slurry Design to Prevent Destabilization of Hydrates in Deepwater Environment, Society of Petroleum Engineers, 2008, SPE 113631.

B.R. Reddy, Novel Low Heat-of-Hydration Cement Compositions for Cementing Gas Hydrate Zones, Society of Petroleum Engineers, 2008, SPE 114927.

Sairam Pks et al., Design Considerations for Isolating Gas-Hydrate-Bearing Zones in Deepwater Environments, Society of Petroleum Engineers, 2012, SPE 157280.

L.F. Maier et al., Cementing Materials for Cold Environments, Journal of Petroleum Technology, Oct. 1971, pp. 1215-1220.

S.H. Shryock et al., Low-temperature (Permafrost) Cement Composition, Halliburton Services, Los Angeles, CA & Duncan, OK respectively, Presented at the Spring Meeting of the Pacific Coast District API Division of Production, May 1969, pp. 48-55.

W.C. Cunningham et al., Arctic Cements and Cementing, The Journal of Canadian Petroleum, Oct.-Dec. 1972, pp. 49-55, Montreal, Canada.

Product Data Sheet, Pozmix A, Halliburton Energy Services, Inc.

Product Data Sheet, Permafrost E, Halliburton Energy Services, Inc.

* cited by examiner

POZZOLAN FOR USE IN A CEMENT COMPOSITION HAVING A LOW HEAT OF HYDRATION

TECHNICAL FIELD

Pozzolans are used in cement compositions to reduce the overall cost of the composition without adverse effects. A pozzolan can be used in a cement composition for use in cold environment subterranean formations. The cold environment subterranean formations can be a formation containing gas hydrates or a permafrost formation. The pozzolan reduces the heat of hydration of the cement composition. There may be other instances where the specific subterranean formation could be adversely affected by an increase in temperature during the hydration of the cement. Therefore, cement systems designed for cold environments may be used under these conditions.

SUMMARY

According to an embodiment, a method of cementing in a subterranean formation comprises: introducing a cement composition into a wellbore penetrating the subterranean formation, wherein at least a portion of the subterranean formation has a temperature less than or equal to the freezing point of an aqueous liquid, and wherein the cement composition comprises: (A) cement; (B) water; and (C) a pozzolan, wherein the cement composition has a heat of hydration of less than 50 BTU per pound; and causing or allowing the cement composition to set in the wellbore after the step of introducing.

According to another embodiment, a method of cementing in a subterranean formation comprises: introducing a cement composition into a wellbore penetrating the subterranean formation, wherein at least a portion of the subterranean formation has a temperature less than or equal to the freezing point of an aqueous liquid, and wherein the cement composition comprises: (A) cement; (B) water; and (C) a pozzolan, wherein the pozzolan has a calcium oxide concentration of less than 15% by weight of the pozzolan, and wherein the pozzolan has a concentration of at least 15% by weight of the cement, wherein the cement composition has a heat of hydration of less than 50 BTU per pound; and causing or allowing the cement composition to set in the wellbore after the step of introducing.

DETAILED DESCRIPTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a cement composition can consist essentially of cement, water, and the pozzolan. The cement composition can contain other ingredients so long as the presence of the other ingredients does not materially affect the basic and novel characteristics of the claimed invention, i.e., so long as the cement composition exhibits the desired heat of hydration or compressive strength.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase, whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

As used herein, a "cement composition" is a mixture of at least cement and water. A cement composition can include additives. As used herein, the term "cement" means an initially dry substance that, in the presence of water, acts as a binder to bind other materials together. Examples of cement include, but are not limited to, Portland cement, Gypsum cement, and high aluminate cements such as calcium-aluminate cements (CAC). A cement composition is generally a slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, a geothermal well, or a well penetrating a gas hydrate deposit. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Some reservoirs are located in cold environments. Two such examples of these cold environments are permafrost regions and some off-shore drilling. In geology, a permafrost region is a region containing soil at or below the freezing point of water 0° C. (32° F.) for two or more years. Most permafrost is located in high latitudes (i.e., land close to the North and South poles), but alpine permafrost may also exist at high altitudes in much lower latitudes.

In off-shore drilling, a production tubing is inserted into a body of water and extends through the water to the sea floor. A wellbore is then drilled through the sub-sea land into a reservoir or adjacent to a reservoir. The wellhead is located at or near the top of the sea floor. The body of water and the wellbore can be several hundred to several thousands of feet deep. As used herein, the term "sea" and all grammatical variations thereof, means a body of water and includes, without limitation, a river, a pond, a lake, a gulf, or an ocean. As used herein, the term "seawater" means the water located within the sea. The seawater can be freshwater, salt water, or brackish water. The temperature of the water at the sea floor and the sub-sea reservoir can be very low depending on the depth of the sea floor from the surface of the sea.

Gas hydrates occur naturally in cold environments where the temperature and pressure are sufficient to freeze water. For example, gas hydrates occur naturally onshore in permafrost regions, and at certain depths in the sea, where water and gas combine at low temperatures and high pressures to form the hydrate. Methane, or natural gas, is typically the dominant gas in the hydrate structure. One example of gas hydrate formation is when gas emerges from a wellhead wherein water molecules from the surrounding environment form a cage-like structure around high concentrations of the gas molecules and freeze into a solid gas/water structure. Another example of gas hydrate existence is in the form of gas hydrate deposits. About 6.4 trillion tons of methane gas is trapped in deposits of methane hydrates on the deep ocean floor. Methane hydrate is a solid form of water that contains a large amount of methane within its crystal structure. Extremely large deposits of methane hydrates have been found under sediments on the ocean floors. The worldwide amount of methane contained in gas hydrates is considered at least $1 \times 10^4$ gigatons of carbon (in a very conservative estimate). This is about twice the amount of carbon held in all fossil fuels on earth. Methane hydrates are believed to form by migration of gas from great depths along geological faults, followed by precipitation, or crystallization, upon contact of the rising gas stream with cold seawater.

The temperature and pressure of the surrounding environment dictates whether a gas hydrate remains stable. For example, at higher pressures, methane hydrates remain stable at temperatures up to 18° C. However, above a certain temperature and below a certain pressure, a gas hydrate can become destabilized. As used herein, the word "destabilized" with reference to a gas hydrate means that the gas molecules are liberated from the cage-like structure surrounding the molecules, for example via a phase change of the water from a solid to a liquid. In this manner, the cage-like structure no longer sequesters the gas molecules and the gas molecules are free to move and behave like a gas instead of a solid.

Cementing a well through gas hydrate containing zones has been problematic. The problems encountered because of destabilization of gas hydrates and the liberation of the gases can include the following: poor bonding between cement and the formation, the formation of gas channels in the cement column caused by gas migration, gas leakage to the surface outside the casing, casing failures, and fires. By way of example, after cementing operations have been performed, gas hydrates are commonly destabilized wherein the liberated gas is directed to a desired location via the use of pipes or tubulars. However, premature destabilization of the gas hydrates can mean that the gas is not directed to the desired location, but rather migrates to undesired locations and can cause some of the aforementioned problems.

Previous attempts to solve the problems with cementing in cold environments includes cement compositions containing a Portland cement and gypsum combination, or Portland cement/aluminosilicate combinations, calcium aluminate and calcium sulfate blends, and zeolite or zeolite and fly ash-based compositions. Recently, cement blends containing lecithin to stabilize gas hydrates during wellbore cementing operations were described in US patents, U.S. Pat. No. 8,240,385 B2 issued to Lance E. Brothers and Anthony V. Palmer on Aug. 14, 2012; and U.S. Pat. No. 7,373,982 B2 issued to Lance E. Brothers, Fouad Fleyel, James F. Heathman, Ali Shinta, and Shada Salih on May 20, 2008. However, there is still a need for cement composition formulations that can be used in gas hydrate zones.

Cementing operations include introducing a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, squeeze cementing, or gravel packing operations. However, the reaction of cement with water is an exothermic reaction. The total heat released during the reaction of cement with water depends on the various ingredients in the cement, the amount of cement, and the water-to-cement ratio. The heat given off during this reaction can be great enough to increase the temperature such that destabilization of gas hydrates occurs. This can cause premature destabilization of the gas hydrates.

Other problems can occur in permafrost formations. The permafrost formations contain water or compounds containing water in a solid state. Melting of the ice can create a thin layer of liquid water between the cement and the formation, thus creating a weak bond with the cement and the formation. As a result, some areas of the wellbore or annulus may not be properly cemented causing a host of other problems. It is to be understood that discussions regarding the melting of ice or "water" is not meant to include only freshwater, but can also include water containing dissolved and/or undissolved substances.

Cement generally contains four main types of minerals. Cement can also include other minerals in addition to the four main types. The minerals in cement are commonly referred to as the phases of the cement. The four main phases of cement are called alite, belite, aluminate, and ferrite.

"Alite" is a name for tricalcium silicate and "belite" is a name for dicalcium silicate. Cement chemist often abbreviate alite as $C_3S$ and belite as $C_2S$. Both, alite and belite have different compositions compared to pure tricalcium silicate and dicalcium silicate because each one contains minor amounts of other oxides besides calcium oxide (CaO) and silicon dioxide ($SiO_2$).

"Aluminate" is a name for tricalcium aluminate, abbreviated by cement chemists as $C_3A$. Aluminate has a different composition compared to pure tricalcium aluminate because it contains minor amounts of other oxides besides CaO and aluminum oxide ($Al_2O_3$). "Ferrite" is a name for tetracalcium aluminoferrite, abbreviated by cement chemists as $C_4AF$. Ferrite has a different composition compared to pure tetracalcium aluminoferrite because it contains minor amounts of other oxides besides CaO, $Al_2O_3$, and iron oxide ($Fe_2O_3$).

When cement is mixed with water, the various phases of the cement can undergo a hydration reaction and form hydration products. The silicate phases (alite and belite) form hydration products of at least calcium silicate hydrate and calcium hydroxide (abbreviated by cement chemists as CH). Calcium silicate hydrate is often abbreviated as C—S—H. The dashes indicate there is no strict ratio of CaO to $SiO_2$ inferred. The aluminate and ferrite phases can form a variety of hydration products, including, hydrogarnet, ettringite, and monosulfoaluminate, depending on the amount of gypsum present in the cement.

Soon after mixing cement with water, aluminate reacts very quickly with the water to form an aluminate-rich gel. This reaction is highly exothermic, but generally lasts for only a few minutes after mixing. This stage in the hydration reaction is normally followed by a few hours of relatively low heat evolution, sometimes called the dormant stage. The dormant stage is when a cement composition can be placed in the location to be cemented. Eventually, the cement composition becomes too viscous to place in the desired location. At the end of the dormant stage, the alite and belite start to react with the water to form their hydration products. The hydration products occupy a larger volume in the cement composition compared to the solid phases. Consequently, the cement composition is converted from a viscous slurry into a rigid solid material. C—S—H can represent up to 70% by volume of the cement composition matrix and is primarily what gives the cement composition its mechanical properties, such as compressive strength.

Each phase of the cement generally reacts at a different rate to form their hydration products. Some of the factors that can influence the reaction rate of the various phases of the cement and water include: the type of the reactant; the physical state of the reactants; the concentration of the reactants in relation to each other; and temperature. The four main phases of cement have the following order of reaction rates based solely on the type of the reactant: aluminate ($C_3A$)>alite ($C_3S$)>belite ($C_2S$)>ferrite ($C_4AF$). For example, alite hydrates and hardens rapidly and is responsible for the initial setting and early compressive strength of a cement composition. By contrast, belite hydrates and hardens more slowly and contributes to the development of compressive strength of the cement composition at a later time (normally beyond 7 days after mixing).

The heat of hydration can be different for each of the phases in a cement. By way of example, the hydration reactions along with the associated heat of hydration (ΔH) for the alite ($C_3S$) and belite ($C_2S$) phases of cement are shown below with units in kilojoules per mole (kJ/mol).

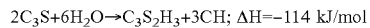

(tricalcium silicate)+(water)→(C—S—H)+(calcium hydroxide)

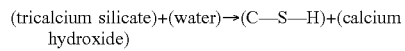

(dicalcium silicate)+(water)→(C—S—H)+(calcium hydroxide)

wherein "C" denotes calcium oxide (CaO). The negative sign on ΔH indicates that heat is liberated during the cement hydration.

The overall heat given off during the hydration reaction of the cement with water can vary depending on the concentration of the phases of the cement and the total volume of cement used in a cementing operation. For example, in a deepwater environment, very often the 36-inch pipe is jetted and inside it, a 13⅝-inch casing may be run and cemented as a part of the tapered string. The amount of cement slurry inside the annulus of the surface casing is usually high and could result in release of a great amount of heat during hydration of the cement slurry. Depending on the cement-slurry formulation, the heat liberated during hydration (ΔH) could be as high as 150 British Thermal Units per pound "BTU/lb" (349 kilojoules per kilogram "kJ/kg") of cement slurry. Some studies have shown that the temperature of the annulus changes as a function of the slurry heat of hydration. For a ΔH value of 25 BTU/lb, the temperature in an annulus after 24 hours can be as high as 20° C., whereas the temperature of the annulus could be as high as 30° C. for a ΔH value of 50 BTU/lb. These are the temperatures reached inside the annulus. These temperatures are at the end of 24 hours and temperatures higher than these values are reached in the first 6 hours after cement slurry placement.

Thus, there exists a need for a cement composition that has a heat of hydration that is less than the amount of heat needed to thaw an aqueous liquid in a solid state and/or destabilize gas hydrates. This need exists so that cementing operations can be performed in cold environments, such as permafrost regions and off-shore drilling, without the cementing operation causing adverse effects.

It has been discovered that a pozzolan containing a low concentration of calcium oxide (CaO) can be added to a cement composition that results in a substantial decrease of the overall heat given off during the hydration reaction of the cement and water. It has also been discovered that a pozzolan of ground granulated blast furnace slag can be added to a cement composition that results in a substantial decrease of the overall heat given off during the hydration reaction of the cement and water. The pozzolan can decrease the overall concentration of the cement phases in the cement composition, thereby decreasing the overall amount of heat produced during the exothermic heat of hydration reaction. Also, the pozzolan does not adversely affect other desirable properties, such as the compressive strength of the cement composition, resisting formation fluid influx, rheology, fluid loss, and mixability.

As used herein, a "pozzolan" is a siliceous or siliceous and aluminous material which, in itself, possesses little or no cementitious value but which will, in finely divided form and in the presence of water, chemically react with a source of calcium to form compounds possessing cementitious properties. As used herein, the phrase "cementitious properties" means the ability to bind materials together and set. It is to be understood that the term "pozzolan" does not necessarily indicate the exact chemical make-up of the material, but rather refers to its capability of reacting with a source of calcium and water to form compounds possessing cementitious properties. When a pozzolan is mixed with water, the silicate phases of the pozzolan can undergo a hydration reaction and form hydration products of C—S—H and possibly calcium aluminate hydrate. The degree to which a material functions as a pozzolan can be determined by the material's pozzolanic activity. The pozzolanic activity of a pozzolan is the reaction rate between the pozzolan and a source of calcium (e.g., $Ca^{2+}$, calcium oxides "CaO", or calcium hydroxides "$Ca(OH)_2$") in the presence of water. The pozzolanic activity can be measured by determining the amount of calcium the pozzolan consumes over time or by determining the compressive strength of a pozzolan composition containing the pozzolan and water or a cement composition containing cement, the pozzolan, a source of calcium, and water.

A pozzolan is generally less expensive than cement and can generally be included in a cement composition up to 100% or more by weight of the cement. Therefore, a pozzolan can not only decrease the overall cost of the cement composition, but also will not cause adverse effects to the desirable properties of the cement composition (e.g., the compressive strength or setting time). Moreover, the exact composition of the pozzolan can be modified such that a cement composition containing the pozzolan can have a desired amount of heat produced during any chemical reaction (e.g., a reaction of the cement and/or the pozzolan and water).

One example of a pozzolan is ground granulated blast furnace slag "GGBFS". Blast furnace slag "BFS" is formed when iron ore or iron pellets, coke and a flux (either limestone or dolomite) are melted together in a blast furnace. When the metallurgical smelting process is complete, the lime in the flux has been chemically combined with the aluminates and silicates of the ore and coke ash to form a non-metallic product called blast furnace slag. During the period of cooling and hardening from its molten state, BFS can be cooled in several ways to form any of several types of BFS products including GGBSF.

It is to be understood that if any test (e.g., heat of hydration or compressive strength) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). After the cement composition is ramped up to the specified temperature and possibly specified pressure, the cement composition is maintained at that temperature and pressure for the duration of the testing.

If any test (e.g., heat of hydration or compressive strength) requires the cement composition to be mixed, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in no more than a total of 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

The heat of hydration test of a cement composition could be performed in a standard calorimeter or can also be performed as follows. The cement composition is mixed. A known amount of the cement composition is then placed into a Thermos bottle. The mass fraction of each material by weight of the total weight of the composition tested is determined by dividing the weight of the material used in the composition by the total weight of the composition. For example, a cement composition made with 667 grams (g) cement, 525 g pozzolan, and 521 g water, results in mass fraction values of 0.3894 for the cement, 0.3065 for the pozzolan, and 0.3041 for the water. A thermocouple is coated with a small amount of grease so it may be removed from the set cement composition after the test is concluded. The thermocouple is inserted through a Styrofoam stopper so that the thermocouple tip will be in the center of the cement composition during testing. The Thermos bottle is sealed with the Styrofoam stopper. The Thermos bottle is placed into an insulated curing container. The thermocouple is connected to a temperature recorder. The initial temperature of the cement composition is recorded. The temperature of the composition is continually recorded after the initial temperature has been recorded. The temperature is recorded for at least 8 hours after the maximum temperature has been reached to verify that no other chemical reactions will occur.

The heat of hydration of the cement composition is calculated as follows and is expressed in units of BTU/lb. First, calculate the adiabatic temperature rise (ΔT) of the cement composition using the following equation, reported in units of ° F.:

$$\Delta T = T_{max} - T_{initial}$$

where $T_{max}$ is the maximum recorded temperature of the cement composition and $T_{initial}$ is the initial recorded temperature of the cement composition. Second, calculate the heat of hydration (ΔH) of the cement composition according to the following equation:

$$\Delta H = \Delta T(\Sigma X \hat{C}_p)$$

where ΔT is the calculated adiabatic temperature rise from equation 1, Σ is the summation of the products of X and $\hat{C}_p$ for each ingredient in the cement composition, X is the mass fraction for each ingredient, and $\hat{C}_p$ is the specific heat capacity for each ingredient in units of BTU/lb*° F. The specific heat capacity for each ingredient can be found in literature or calculated using known equations. By way of example, the specific heat capacity of water is 1.000 BTU/lb*° F.

A desirable property of a cement composition is a high compressive strength. Cement composition compressive strengths can vary from 0 psi to over 10,000 pounds force per square inch "psi" (0 to over 69 MPa). Compressive strength is generally measured at a specified time after the composition has been mixed and at a specified temperature and pressure. Compressive strength can be measured, for example, at a time of 24 hours. The non-destructive compressive strength method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or megapascals "MPa".

According to an embodiment, a method of cementing in a subterranean formation comprises: introducing a cement composition into a wellbore penetrating the subterranean formation, wherein at least a portion of the subterranean formation has a temperature less than or equal to the freezing point of an aqueous liquid, and wherein the cement composition comprises: (A) cement; (B) water; and (C) a pozzolan, wherein the cement composition has a heat of hydration of less than 50 BTU per pound; and causing or allowing the cement composition to set in the wellbore after the step of introducing.

According to another embodiment, a method of cementing in a subterranean formation comprises: introducing a cement composition into a wellbore penetrating the subterranean formation, wherein at least a portion of the subterranean formation has a temperature less than or equal to the freezing point of an aqueous liquid, and wherein the cement composition comprises: (A) cement; (B) water; and (C) a pozzolan, wherein the pozzolan has a calcium oxide concentration of less than 15% by weight of the pozzolan, and wherein the pozzolan has a concentration of at least 15% by weight of the cement, wherein the cement composition has a heat of hydration of less than 50 BTU per pound; and causing or allowing the cement composition to set in the wellbore after the step of introducing.

The discussion of preferred embodiments regarding the cement composition or any ingredient in the cement composition, is intended to apply to all of the composition embodiments and method embodiments. Any reference to the unit "gallons" means U.S. gallons.

The methods include introducing a cement composition into a wellbore penetrating a subterranean formation. At least a portion of the subterranean formation has a temperature less than or equal to the freezing point of an aqueous liquid. The portion of the subterranean formation having a temperature less than or equal to the freezing point of the aqueous liquid is preferably the portion of the formation to be cemented. The subterranean formation can be located off-shore or in a permafrost region. The subterranean formation can also be a gas hydrate deposit. For off-shore formations, the formation is preferably located below the surface of a body of water at a sufficient distance such that the aqueous liquid is in a solid state. The aqueous liquid can be freshwater, brackish water, brine, or seawater. For example, water occurring in the subterranean formation can include dissolved and/or undissolved substances such as dissolved salt. According to this example, the at least a portion of the subterranean formation would have a temperature less than the freezing point of the salt water as the salt would decrease the freezing point of the saltwater. The subterranean formation can also contain gas hydrate deposits. Preferably, the subterranean formation is located in an area where gas hydrate formation occurs.

The wellbore penetrates the subterranean formation. The wellbore is part of a well. The well can be without limitation an oil, gas, or water production well or an injection well. According to another embodiment, gas hydrates are present in or adjacent to, a portion of the well. The portion of the well is preferably the portion of the well to be cemented. The gas hydrates can be capable of becoming de-stabilized in the portion of the well.

The cement composition includes cement. A variety of cements may be utilized in accordance with the present invention, including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, API Specification for Materials and Testing for Well Cements, Specification 10, Fifth Ed., Jul. 1, 1990. Preferably, the cement is Class G or Class H cement. The cement can be Brazil Class G cement.

The cement composition includes water. The water can be selected from the group consisting of freshwater, brackish water, saltwater, and any combination thereof. The cement composition can further include a water-soluble salt. Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 36% by weight of the water (bwow).

The cement composition includes a pozzolan. The pozzolan can include at least the compounds silicon dioxide ($SiO_2$), aluminum oxide ($Al_2O_3$), and calcium oxide (CaO). According to an embodiment, the pozzolan contains additional compounds. Examples of additional compounds include, but are not limited to, iron III oxide ($Fe_2O_3$), magnesium oxide (MgO), phosphorus pentoxide ($P_2O_5$), sulfur trioxide ($SO_3$), potassium oxide ($K_2O$), titanium dioxide ($TiO_2$), and combinations thereof in any proportion. Preferably, the $SiO_2$, $Fe_2O_3$, and $Al_2O_3$, comprise at least 70% of the total chemical composition of the pozzolan. The $SiO_2$, $Fe_2O_3$, and $Al_2O_3$, can comprise between 70% to 100% of the total chemical composition of the pozzolan. The concentration of the $SiO_2$, $Fe_2O_3$, and $Al_2O_3$, can be a percentage such that the pozzolan has a desired pozzolanic activity. The $SiO_2$ can be in a concentration in the range of about 40% to about 65% of the total chemical composition of the pozzolan. The $Fe_2O_3$ can be in a concentration in the range of about 2% to about 10% of the total chemical composition of the pozzolan. The $Al_2O_3$ can be in a concentration in the range of about 15% to about 40% of the total chemical composition of the pozzolan.

According to an embodiment, the pozzolan is ground granulated blast furnace slag "GGBFS". According to this embodiment, the GGBFS can be in a concentration by weight of the cement such that the cement composition has a heat of hydration (HOH) less than 50 British Thermal Units "BTU" per pound (BTU/lb), preferably less than 40 BTU/lb. It is to be understood that while the cement composition can contain other additives, it is the pozzolan and the concentration of the pozzolan that is responsible for providing the desired HOH for the cement composition. For example, a cement consisting essentially of or consisting of the cement, the water, and the pozzolan can have a HOH less than the desired value. The GGBFS can be in a concentration of at least 75% by weight of the cement. The GGBFS can also be in a concentration in the range of about 75% to about 245% by weight of the cement, preferably about 100% to about 150% by weight of the cement.

According to another embodiment, the concentration of CaO in the pozzolan is equal to or less than the concentration necessary for the cement composition to have a heat of hydration less than 50 BTU/lb, preferably less than 40 BTU/lb. According to another embodiment, the pozzolan has a calcium oxide concentration of less than 15%, preferably less than 10%, more preferably less than 5%, by weight of the pozzolan. According to yet another embodiment, the concentration of CaO is less than or equal to the concentration necessary such that the gas hydrates are not de-stabilized. The concentration of the CaO in the pozzolan can also vary depending on the specific cement used. For example, the concentration of CaO in the pozzolan may need to be reduced when used in a cement containing higher amounts of aluminate or alite as the cement naturally contains higher amounts of the exothermic phases. In this manner, a cement containing higher concentrations of aluminate or alite (e.g., high alumina cements) can still produce the desired heat of hydration by decreasing the concentration of the CaO in the pozzolan.

The pozzolan can react with a source of calcium and the water to form compounds possessing cementitious properties in the cement composition. The source of calcium can be $Ca^{2+}$. The cement can provide the source of calcium for the pozzolan. The source of calcium can be calcium oxide (CaO) or calcium hydroxide ($Ca(OH)_2$) and can be the product of a reaction between the cement and the water. The source of calcium can also come from another additive, such as lime. According to this embodiment, the cement composition or the pozzolan can further include lime. The lime can be slaked lime or hydrated lime. The amount of calcium present in the cement composition or the concentration of the lime can be a sufficient amount such that the pozzolan is capable of reacting with the calcium and water to yield compounds possessing cementitious properties.

The amount of pozzolanic activity of the pozzolan can vary. One of the factors determining the amount of pozzolanic activity of the pozzolan can be the particle size of the pozzolan. Other additives are commonly included in a cement composition that may decrease the HOH of the cement composition. However, these other additives, such as inert fillers, may not provide the necessary compressive strength for oil or gas operations. Therefore, the pozzolan can be capable of not only decreasing the overall HOH of the cement composition, but also provide a desired compressive strength. According to an embodiment, the particle size of the pozzolan is selected such that a mixture consisting essentially of or consisting of the cement, the water, and the pozzolan develops a compressive strength of at least 500 psi (3.4 MPa), preferably at least 1,000 psi (6.9 MPa), at a time of 48 hours, a temperature of 100° F. (38° C.), and a pressure of 3,000 psi (20.7 MPa). The pozzolan can be a bulk particle. As used herein, a "bulk particle" is a particle having a particle size of greater than 1 micrometer (1 μm or 1 micron). The pozzolan can also have a particle size distribution such that at least 90% of the pozzolan has a particle size in the range of about 30 microns to 75 microns. Preferably, the pozzolan has a particle size distribution such that at least 90% of the pozzolan has a particle size of about 70 microns. The particle size of the pozzolan and the concentration of the pozzolan can be selected such that the cement composition develops a compressive strength of at least 500 psi (3.4 MPa), preferably at least 1,000 psi (6.9 MPa), at a time of 48 hours, a temperature of 100° F. (38° C.), and a pressure of 3,000 psi (20.7 MPa).

The concentration of the pozzolan can vary. According to an embodiment, the pozzolan is in a concentration of at least 15% by weight of the cement (bwoc). The pozzolan can also be in a concentration of at least 30% bwoc. The pozzolan can also be in a concentration in the range of about 15% to about 245% bwoc. According to another embodiment, the concentration of the pozzolan is selected such that the cement composition has a heat of hydration of less than 50 BTU/lb, preferably less than 40 BTU/lb. According to yet another embodiment, the concentration of the pozzolan is greater than or equal to the necessary concentration such that gas hydrates are not de-stabilized. According to yet another embodiment, the concentration of the pozzolan is greater than or equal to the necessary concentration such that the aqueous liquid in a solid state does not melt into a liquid state. This aspect may be useful when it is undesirable for water in a permafrost formation to melt. This aspect can also be useful to prevent the ice structure surrounding the gas molecules of a gas hydrate structure to melt, thus liberating the gas molecules.

In an embodiment, the cement composition is in a pumpable state prior to and during introduction into the subterranean formation.

According to an embodiment, the cement composition has an initial setting time of less than 24 hours, more preferably less than 12 hours, at a temperature of 100° F. (38° C.) and a pressure of 3,000 psi (20.7 MPa). In another embodiment, the cement composition has an initial setting time of less than 24 hours, more preferably less than 12 hours, at the bottomhole temperature and pressure of the subterranean formation. As used herein, the term "bottomhole" refers to the portion of the subterranean formation to be cemented.

The cement composition can have a setting time of less than 48 hours, preferably less than 24 hours, more preferably less than 12 hours, at a temperature of 100° F. (38° C.) and a pressure of 3,000 psi (20.7 MPa). According to another embodiment, the cement composition has a setting time of less than 48 hours, preferably less than 24 hours, more preferably less than 12 hours, at the bottomhole temperature and pressure of the subterranean formation.

According to an embodiment, the cement composition has a compressive strength of at least 500 psi (3.4 MPa), preferably at least 1,000 psi (6.9 MPa), at 48 hours, a temperature of 100° F. (149° C.) and a pressure of 3,000 psi (20.7 MPa). According to another embodiment, the cement composition has a compressive strength in the range of about 500 to about 5,000 psi (about 3.4 to about 34.5 MPa) at the bottomhole temperature and pressure of the subterranean formation.

The cement composition can further include other additives. Examples of other additives include, but are not limited to, a weighting agent, a fluid loss additive, a set retarder, a set accelerator, a friction reducer, a light-weight additive, a defoaming agent, a high-density additive, elastomers, a mechanical property enhancing additive, a lost-circulation material, a filtration-control additive, a gas migration control additive, a thixotropic additive, a viscosifying additive, and combinations thereof. The cement composition can also be foamed.

The cement composition can include a weighting agent. Suitable examples of commercially-available weighting agents include, but are not limited to, HIGH DENSE® No. 3, HIGH DENSE® No. 4, HIGH DENSE® No. 5, BARITE™, and MICROMAX™ heavy-weight additives marketed by Halliburton Energy Services, Inc. Preferably, the weighting agent is in a concentration in the range of about 0.05% to about 10% bwoc.

The cement composition can include a fluid loss additive. Suitable examples of commercially-available fluid loss additives include, but are not limited to, and are marketed by Halliburton Energy Services, Inc. under the tradenames HALAD®-344, HALAD®-413, and HALAD®-300. Preferably, the fluid loss additive is in a concentration in the range of about 0.05% to about 10% bwoc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. Preferably, the set retarder is in a concentration in the range of about 0.05% to about 10% bwoc.

The cement composition can include a friction reducer. Suitable examples of commercially-available friction reducers include, but are not limited to, and are marketed by Halliburton Energy Services, Inc. under the tradenames CFR-2™, CFR-3™, CFR-5LE™, CFR-6™, and CFR-8™. Preferably, the friction reducer is in a concentration in the range of about 0.1% to about 10% bwoc.

Commercially-available examples of other additives include, but are not limited to, and are marketed by Halliburton Energy Services, Inc. under the tradenames SPHER-ELITE® and LUBRA-BEADS® FINE, light-weight additives; SILICALITE™, extender and compressive-strength enhancer; WELLLIFE® 665, WELLLIFE® 809, and WELLLIFE® 810 mechanical property enhancers.

In one embodiment, the cement composition has a density of at least 8 pounds per gallon (ppg) (0.96 kilograms per liter (kg/l)). In another embodiment, the cement composition has a density of at least 15 ppg (1.8 kg/l). In another embodiment, the cement composition has a density in the range of about 8 to about 20 ppg (about 0.96 to about 2.4 kg/l).

The method embodiments include the step of introducing the cement composition into a wellbore penetrating the subterranean formation. The step of introducing can be for the purpose of at least one of the following: well completion; foam cementing; primary or secondary cementing operations; well-plugging; squeeze cementing; and gravel packing. The wellbore is part of a well. According to another embodiment, the well includes an annulus. According to this other embodiment, the step of introducing includes introducing the cement composition into a portion of the annulus. The portion of the wellbore, the portion of the annulus, or an area adjacent to the well can contain the aqueous liquid in a solid state (i.e., frozen) or gas hydrates. Accordingly, the lower heat of hydration formed during the reaction of the cement and/or the pozzolan with the water means that the aqueous liquid in the solid state and gas hydrates can remain frozen and stable during the cementing operation. In this manner, premature melting of the ice and de-stabilization of the gas hydrates in the area being cemented is substantially inhibited or prevented. It is to be understood that some melting of the aqueous liquid in a solid state (e.g., the ice cage structure surrounding the gas of the gas hydrates) can occur; however, the degree of melting should not be so great as to impair the oil or gas operations being performed. Accordingly, it is preferable that less than 10% of the aqueous liquid in a solid state melts at or adjacent to the area of the cementing operation.

The method embodiments can further comprise the step of forming the cement composition prior to the step of introducing. According to this embodiment, the step of forming can comprise: adding at least the cement, the water, and the pozzolan to a mixing apparatus; and mixing the cement composition. The step of forming can further include adding other additives to form the cement composition. The step of mixing can be performed using a suitable mixing apparatus.

The method embodiments also include the step of allowing the cement composition to set in the wellbore after the step of introducing the cement composition. The method embodiments can include the additional steps of perforating, fracturing, or performing an acidizing treatment, after the step of allowing.

The cement composition and pozzolan can be used in a variety of wells. Even though the pozzolan is more suited for use in low-temperature environments where gas hydrates may be present, the pozzolan can also be used in higher-temperature environments and other non-gas hydrate formations where a low heat of hydration is desirable. According to an embodiment, the subterranean formation has a bottomhole temperature in the range of about −5° F. to about 450° F. (about −21° C. to about 232° C.).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Unless stated otherwise, all of the cement compositions were mixed and tested according to the procedure for the specific test as described in The Detailed Description section above.

Table 1 contains the chemical composition and percentages of a novel pozzolan according to certain embodiments and POZMIX® A cement additive of a fly ash as determined by X-ray fluorescence (XRF) analysis.

TABLE 1

| Chemical Compound | Novel pozzolan Conc. (% by weight) | POZMIX ® A Conc. (% by weight) |
|---|---|---|
| $Al_2O_3$ | 29.39 | 18.8 |
| $SiO_2$ | 58.96 | 49.4 |
| $P_2O_5$ | 0.61 | 0.9 |
| $K_2O$ | 1.11 | 0.7 |
| CaO | 1.26 | 15.7 |
| $TiO_2$ | 2.69 | 2.1 |
| $Fe_2O_3$ | 5.43 | 7 |
| MgO | 0.44 | 4.3 |
| $SO_3$ | 0.11 | 1.1 |

As can be seen in Table 1, the concentration of calcium oxide (CaO) was 1.26% by weight of the pozzolan for the novel pozzolan versus 15.7% for POZMIX® A.

The tests for Table 2 were conducted to determine the heat of hydration and compressive strength for two cement compositions. The data in Table 2 includes the concentration of ingredients, the heat of hydration, and the compressive strength for each cement composition. The compressive strength was measured at a time of 18 hours, a temperature of 100° F. (38° C.), and a pressure of 3,000 psi (20.7 MPa). The concentration of any ingredient in the cement composition can be expressed as, by weight of the cement (abbreviated as "bwoc") or gallons per sack (abbreviated as "gal/sk"). Each of the cement compositions had a density of 15.8 pounds per gallon (lb/gal) (1.89 kg/l) and contained at least the following ingredients: varying concentrations of deionized water; Dyckerhoff Class G cement; either POZMIX® A cement additive of a fly ash made from burned coal (marketed by Halliburton Energy Services, Inc.) or the novel pozzolan; HALAD®-344 fluid loss additive (marketed by Halliburton Energy Services, Inc.); and D-AIR 3000L™ defoamer (marketed by Halliburton Energy Services, Inc.). All of the ingredients are shown in concentrations of % bwoc except for the defoamer, which is shown in units of gal/sk.

TABLE 2

|  | Composition #1 | Composition #2 |
|---|---|---|
| Cement | 100.0% | 100.0% |
| Novel pozzolan | 20.0% | — |
| POZMIX ® A | — | 20.0% |

TABLE 2-continued

|  | Composition #1 | Composition #2 |
| --- | --- | --- |
| HALAD ®-344 | 0.3% | 0.3% |
| D-AIR 3000L ™ | 0.05 | 0.05 |
| Water | 48.4% | 49.6% |
| Heat of Hydration (BTU/lb) | 37.18 | 55.21 |
| Compressive Strength (psi) | 2,400 | 2,400 |

As can be seen in Table 2, cement composition #1 containing the novel pozzolan had a much lower heat of hydration (HOH) compared to cement composition #2 containing a pozzolan having a much higher CaO content. Composition #2 had a HOH of 55.21, which would cause an aqueous liquid in a solid state to melt. This indicates that decreasing the concentration of CaO in the pozzolan can greatly reduce the heat of hydration of a cement composition. Moreover, as can be seen in Table 2, both cement compositions exhibited comparable compressive strengths. This indicates that decreasing the CaO concentration of the pozzolan does not adversely affect the pozzolanic activity of the novel pozzolan, and that the novel pozzolan works effectively as a pozzolan without impairing the desirable properties of the cement composition.

Table 3 contains a list of ingredients, each ingredient's concentration, and the type of additive for a pozzolan according to other embodiments. The pozzolan according to these other embodiments is Lafarge ground granulated blast furnace slag "GGBFS". Cement blend #1 contained Class G cement, GGBFS at a concentration of 137.5% bwoc, and a Micro Matrix cement at a concentration of 12.5% bwoc. All other additive concentrations are expressed in units of % bwocb (by weight of the cement blend), bwoc (by weight of the cement), or gal/sk cb (gallons per sack of the cement blend). Cement composition #1 was a conventional cement composition; composition #2 was a foamed conventional cement composition containing an inert silica additive and other additives; composition #3 is similar to composition #2 except for the type of cement and without foaming; compositions #4 & 5 were new cement compositions containing the GGBFS pozzolan with #5 being foamed.

TABLE 3

| Composition # | Density (ppg) | Slurry Composition and Concentrations | Type of Additive |
| --- | --- | --- | --- |
| 1 | 15.8 | 100% Class G cement Water | |
| 2 | 11 (foamed) | 100% Class G Cement 100% bwoc- SSA ®-1 | Strength Retrogression |
| | | 1.6% bwoc- HALAD ® 413 | Fluid Loss Ctl |
| | | 0.8% bwoc- HALAD ® 344 | Fluid Loss Ctl |
| | | 3% bwoc- ZoneSealant 2000 Sea Water | Foamer |
| 3 | 15.2 | 100% Class G cement 100% bwoc- SSA ®-1 | Strength Retrogression |
| | | 1.6% bwoc- HALAD ® 413 | Fluid Loss Ctl |
| | | 0.8% bwoc- HALAD ® 344 | Fluid Loss Ctl |
| | | 3% bwoc- ZoneSealant 2000 Sea Water | Foamer |

TABLE 3-continued

| Composition # | Density (ppg) | Slurry Composition and Concentrations | Type of Additive |
| --- | --- | --- | --- |
| 4 | 13.5 | 100% Cement Blend #1 0.3% bwocb- GasStop ™ | Gas Migration Ctl |
| | | 5% bwocb- Silicalite ™ | Lightweight Add. |
| | | 4% bwocb- CaCl₂ 0.25 gal/sk cb- Econolite ™ | Liquid Lightweight Add. |
| | | 0.3 gal/sk cb- HALAD ® 413L | Liquid Fluid Loss Ctl |
| | | 7% bwocb- 3M ™ HGS 6000 | Lightweight Bead |
| | | 1.5% bwocb- ZoneSealant 2000 Fresh Water | Foamer |
| 5 | 11 (foamed) | 100% Cement Blend #1 0.3% bwocb- GasStop ™ | Gas Migration Ctl |
| | | 5% bwocb- Silicalite ™ | Lightweight Add. |
| | | 4% bwocb- CaCl₂ 0.25 gla/sk cb- Econolite ™ | Liquid Lightweight Add. |
| | | 0.3 gal/sk cb- HALAD ® 413L | Liquid Fluid Loss Ctl |
| | | 7% bwocb- 3M ™ HGS 6000 | Lightweight Bead |
| | | 1.5% bwocb- ZoneSealant 2000 Fresh Water | Foamer |

Table 4 contains heat of hydration (HOH) and compressive strength data for the cement compositions of Table 3. The HOH was tested at a time of 24 hours, a pressure of 1,700 psi (11.7 MPa), and a temperature of either 77° F. (25° C.) or 53° F. (12° C.). The HOH listed with an "*" means that those HOH values were estimated with equations from mathematical modeling developed from extensive heat of hydration testing instead of measured directly. Compressive strength was measured at a time of either 24 or 48 hours, a temperature of 100° F. (38° C.), and a pressure of 3,000 psi (20.7 MPa).

TABLE 4

| Composition # | Temp (° F.) | HOH (BTU/lb | Compressive Strength (psi) |
| --- | --- | --- | --- |
| 1 | 77 | 55.6 | |
| | 53 | 38.9* | |
| 2 | 53 | 23.9* | |
| 3 | 77 | 37.2 | 65 @ 24 hr |
| | 53 | 23.9* | 198 @ 48 hr |
| 3b | 77 | 69.6 | 96 @ 24 hr |
| | 53 | 52.1* | 226 @ 48 hr |
| 4 | 77 | 42.2 | |
| | 53 | 21.6* | |
| 5 | 53 | 21.6* | 202 @ 24 hr |
| | | | 530 @ 48 hr |

As can be seen in Table 4, cement composition #1 was estimated to generate 38.9 BTU/lb at a temperature of 53° F. (11.7° C.). For composition #2 & 3, the addition of an inert silica material resulted in a reduced HOH of 23.9 BTU/lb. Although the HOH was reduced to an acceptable value, the compressive strength of the set cement composition #3 after 24 hours was only 65 psi and only 198 psi after 48 hours. This shows that adding an inert filling material would decrease the heat of hydration, but may not be strong enough to withstand operational loads in an acceptable timeframe.

In order to improve the compressive strength and to get a reasonable thickening time, 4% calcium chloride was added (composition #3b) which only slightly improved the compressive strength to 96 psi and 226 psi respectively. Moreover, the addition of calcium chloride, which acts as an accelerator, increased the HOH to 52.1 BTU/lb, which is a much higher value than desired and would not be acceptable for use in a permafrost region or wells containing gas hydrates. Cement compositions #4 & 5 containing the GGBFS as the pozzolan not only had a HOH of less than 25 BTU/lb, but also exhibited compressive strengths more than double any of the other cement compositions. This indicates that the GGBFS works effectively as a pozzolan to decrease the overall HOH in a cement composition and also does not adversely affect other desirable properties of the composition, such as compressive strength.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
   introducing a cement composition into a wellbore penetrating the subterranean formation,
       wherein the cement composition comprises:
           (A) a Portland cement;
           (B) water; and
           (C) a pozzolan having a calcium oxide concentration of less than 45% by weight and having an aluminum oxide concentration in the range of about 15% to about 40% by weight, wherein the pozzolan has a concentration of at least 15% by weight of the Portland cement, and wherein the pozzolan is not a fly ash;
       wherein the cement composition has a heat of hydration of less than 50 BTU per pound; and
   causing or allowing the cement composition to set in the wellbore after the step of introducing.

2. The method according to claim 1, wherein the subterranean formation is located off-shore or in a permafrost region.

3. The method according to claim 1, wherein the subterranean formation contains a gas hydrate deposit.

4. The method according to claim 3, wherein gas hydrates are present in or adjacent to, a portion of the wellbore.

5. The method according to claim 1, wherein the water is selected from the group consisting of freshwater, brackish water, saltwater, and any combination thereof.

6. The method according to claim 1, wherein the pozzolan comprises the compounds silicon dioxide.

7. The method according to claim 6, wherein the pozzolan further comprises iron III oxide, and wherein the silicon dioxide, iron III oxide, and aluminum oxide comprise at least 70% of the total chemical composition of the pozzolan.

8. The method according to claim 1, wherein the pozzolan is ground granulated blast furnace slag.

9. The method according to claim 1, wherein the concentration of calcium oxide in the pozzolan is equal to or less than the concentration necessary for the cement composition to have a heat of hydration less than 40 BTU per pound.

10. The method according to claim 1, wherein the concentration of calcium oxide is less than or equal to the concentration necessary such that the gas hydrates are not destabilized.

11. The method according to claim 1, wherein the particle size of the pozzolan is selected such that a mixture consisting essentially of the cement, the water, and the pozzolan develops a compressive strength of at least 500 psi at a time of 48 hours, a temperature of 100° F., and a pressure of 3,000 psi.

12. The method according to claim 1, wherein the cement composition develops a compressive strength of at least 500 psi at a time of 48 hours, a temperature of 100° F., and a pressure of 3,000 psi.

13. The method according to claim 1, wherein the pozzolan is in a concentration of at least 30% by weight of the cement.

14. The method according to claim 1, wherein the concentration of the pozzolan is greater than or equal to the necessary concentration such that the gas hydrates are not destabilized.

15. The method according to claim 1, wherein the concentration of the pozzolan is greater than or equal to the necessary concentration such that the aqueous liquid in a solid state does not melt into a liquid state.

16. The method according to claim 1, wherein at least a portion of the subterranean formation has a temperature close to the freezing point selected from the group consisting of an aqueous liquid, permafrost, and a gas hydrate.

17. A method of cementing in a subterranean formation comprising:
   introducing a cement composition into a wellbore penetrating the subterranean formation,
      wherein at least a portion of the subterranean formation has a temperature less than or equal to the freezing point of an aqueous liquid, and
   wherein the cement composition comprises:
      (A) a Portland cement;
      (B) water; and
      (C) a pozzolan, wherein the pozzolan has a calcium oxide concentration of less than 45% by weight, and having an aluminum oxide concentration in the range of about 15% to about 40% by weight, wherein the pozzolan has a concentration of at least 30% by weight of the Portland cement, wherein the pozzolan is not a fly ash, and wherein the particle size of the pozzolan is selected such that a mixture consisting essentially of the cement, the water, and the pozzolan develops a compressive strength of at least 500 psi at a time of 48 hours, a temperature of 100° F., and a pressure of 3,000 psi;
   wherein the cement composition has a heat of hydration of less than 50 BTU per pound; and
   causing or allowing the cement composition to set in the wellbore after the step of introducing.

18. The method according to claim 17, wherein the concentration of the pozzolan is greater than or equal to the necessary concentration such that the aqueous liquid in a solid state does not melt into a liquid state.

* * * * *

UNITED STATES PATENT AND TRADEMARK OFFICE
CERTIFICATE OF CORRECTION

PATENT NO. : 9,487,691 B2  
APPLICATION NO. : 13/889213  
DATED : November 8, 2016  
INVENTOR(S) : Ravi et al.

It is certified that error appears in the above-identified patent and that said Letters Patent is hereby corrected as shown below:

In the Claims

Column 18, Lines 18-35, Claim 1 should read:

1. A method of cementing in a subterranean formation comprising:
introducing a cement composition into a wellbore penetrating the subterranean formation,
    wherein the cement composition comprises:
        (A) a Portland cement;
        (B) water; and
        (C) a pozzolan having a calcium oxide concentration of less than 45%
        by weight and having an aluminum oxide concentration in
        the range of about 15% to about 40% by weight, wherein the pozzolan
        has a concentration of at least 15% by weight of the Portland cement, and
        wherein the pozzolan is not a fly ash;

Column 19, Line 20 – Column 20, Line 20, Claim 17 should read:

17. A method of cementing in a subterranean formation comprising:
introducing a cement composition into a wellbore penetrating the subterranean formation,
    wherein at least a portion of the subterranean formation has a temperature less
    than or equal to the freezing point of an aqueous liquid, and
    wherein the cement composite comprises:
        (A) a Portland cement;
        (B) water; and
        (C) a pozzolan, wherein the pozzolan has a calcium oxide
        concentration of less than 45% by weight, and having an
        aluminum oxide concentration in the range of about 15% to about 40% by
        weight, wherein the pozzolan has a concentration of at least 30% by
        weight of the Portland cement, wherein the pozzolan is not a fly ash, and
        wherein the particle size of the pozzolan is selected such that a mixture Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office* consisting essentially of the cement, the water, and the pozzolan develops a compressive strength of at least 500 psi at a time of 48 hours, a temperature of 100 °F, and a pressure of 3,000 psi;
    wherein the cement composition has a heat of hydration of less than 50 BTU per pound; and causing or allowing the cement composition to set in the wellbore after the step of introducing.